United States Patent [19]

Woody

[11] 4,424,666
[45] Jan. 10, 1984

[54] FUEL CONTROL SYSTEM AND APPARATUS FOR GAS TURBINE ENGINE

[75] Inventor: John C. Woody, Decatur, Ill.

[73] Assignee: Borg-Warner Corporation, Chicago, Ill.

[21] Appl. No.: 191,093

[22] Filed: Sep. 26, 1980

[51] Int. Cl.³ .................................................. F02C 9/28
[52] U.S. Cl. .............................. 60/39.141; 60/39.281
[58] Field of Search ..................... 60/39.28 R, 39.14 R

[56] References Cited

U.S. PATENT DOCUMENTS

| | | | |
|---|---|---|---|
| 2,635,392 | 4/1953 | Gratzmuller . | |
| 2,744,387 | 5/1956 | Reed et al. . | |
| 2,796,838 | 6/1957 | Phillips . | |
| 2,862,355 | 12/1958 | Davis et al. | 60/39.14 R |
| 3,074,472 | 1/1963 | Williams | 60/39.28 R |
| 3,118,009 | 1/1964 | Phillips . | |
| 3,177,920 | 4/1965 | Phillips . | |
| 3,213,613 | 10/1965 | Schwent et al. | 60/39.28 R |
| 3,252,283 | 5/1966 | Jackson et al. | 60/39.28 R |
| 3,298,418 | 1/1967 | Briggs . | |
| 3,377,024 | 4/1968 | Nutten et al. . | |
| 3,593,736 | 7/1971 | White | 60/39.14 R |
| 3,600,889 | 8/1971 | Ifield | 60/39.28 R |
| 3,713,290 | 1/1973 | Gold | 60/39.28 R |
| 3,808,798 | 5/1974 | Taylor | 60/39.28 R |
| 3,878,676 | 4/1975 | Hitzelberger | 60/39.28 R |
| 3,930,365 | 1/1976 | Smith | 60/39.28 R |
| 3,964,253 | 6/1976 | Paduch et al. | 60/39.14 R |
| 4,274,254 | 6/1981 | Jansen et al. | 60/39.28 R |
| 4,326,376 | 4/1982 | Stearns et al. | 60/39.28 R |

Primary Examiner—Louis J. Casaregola
Attorney, Agent, or Firm—Florian S. Gregorczyk

[57] ABSTRACT

The disclosure embraces a fuel control system and apparatus for delivering or supplying liquid fuel to a gas turbine engine comprising a body construction (12) in which is contained a first diaphragm-actuated fuel control valve arrangement (40) for regulating fuel flow to the turbine engine for normal engine operation, a second diaphragm-actuated fuel control valve arrangement (42) for regulating fuel flow to the turbine engine for engine idling operation, the diaphragm-atuated valve arrangements (40) and (42) being responsive to the difference between the engine burner pressure and the compressor discharge pressure. A third diaphragm-actuated fuel control valve arrangement (44) is provided for supplying fuel to the turbine engine for engine starting purposes. The system and arrangement includes an operator-controlled member (80) for varying resilient biasing pressure on a relief valve (86) for varying the compressor discharge pressure effective on the first diaphragm-actuated valve arrangement for regulating the speed of the turbine engine.

18 Claims, 8 Drawing Figures

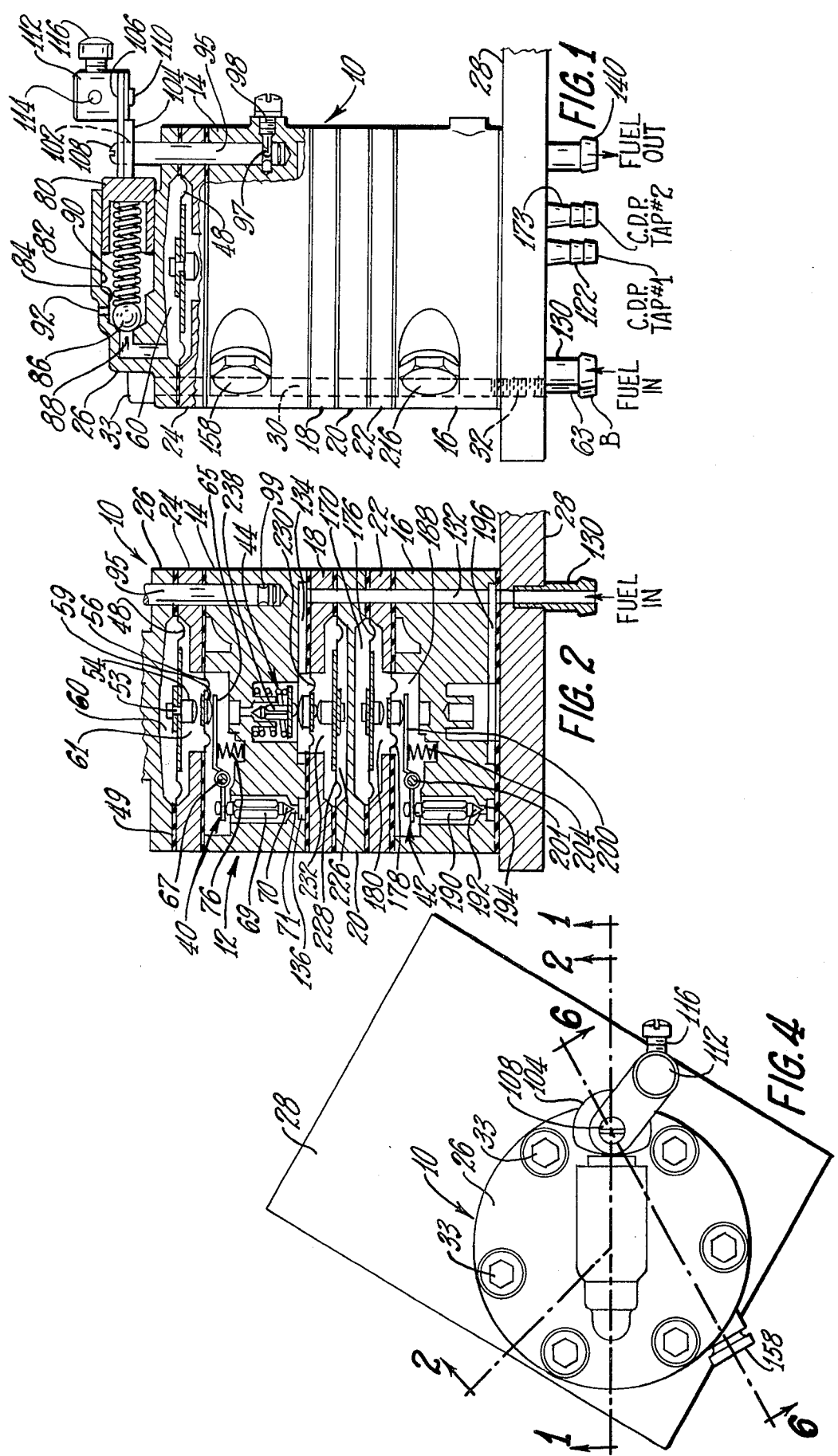

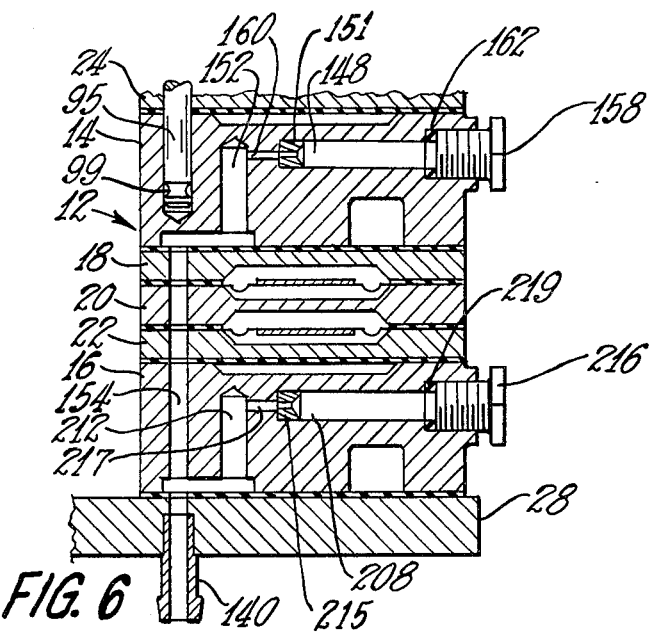
FIG. 6
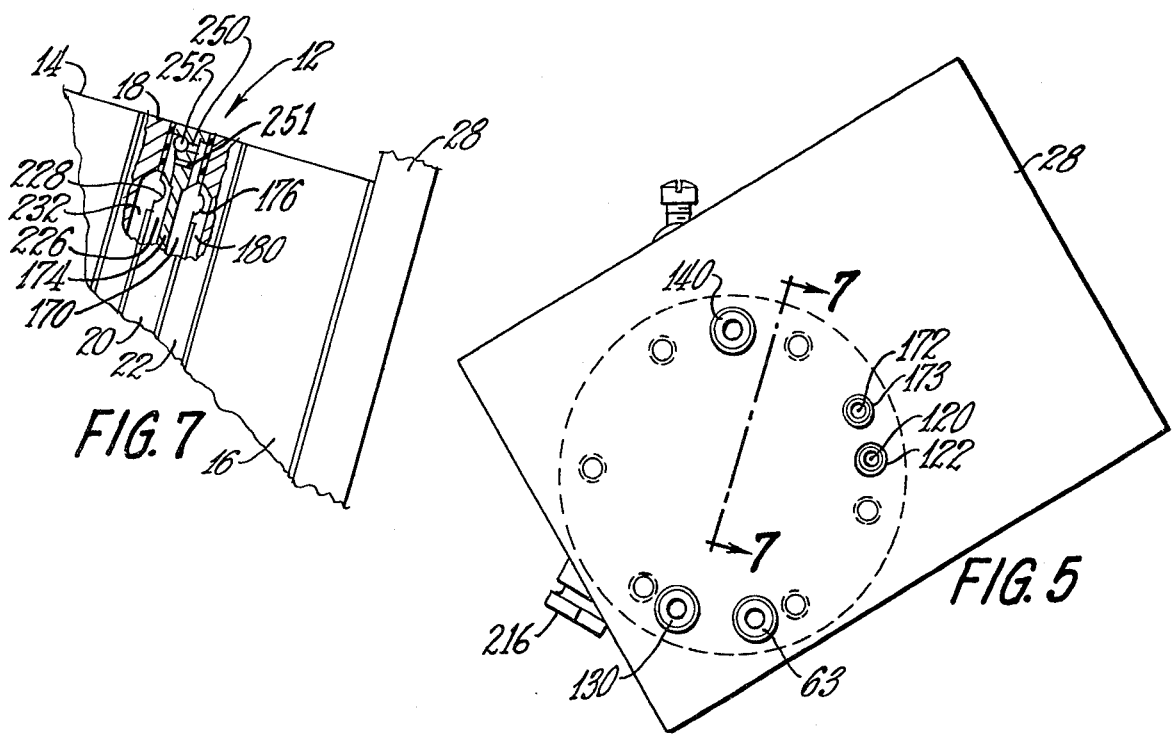
FIG. 7
FIG. 5

FUEL CONTROL SYSTEM AND APPARATUS FOR GAS TURBINE ENGINE

TECHNICAL FIELD

This invention relates to a fuel control system and apparatus for delivering or supplying liquid fuel to a gas turbine engine wherein the fuel flow to the burner chamber of the turbine engine is controlled by diaphragm-actuated means herein the diaphragm means is regulated by compressor discharge pressures and the burner pressure. The fuel control system and apparatus utilizing diaphragm actuation of the fuel feed to the engine is responsive to compressor discharge pressures and burner pressure providing a more efficient and effective control of a gas turbine engine than has heretofore been possible.

BACKGROUND OF THE INVENTION

Gas turbine engines has been utilized wherein the fuel is delivered to the burner chamber of a turbine engine by fuel injection under direct fuel pump pressure by manual control of the rate of delivery of fuel to the burner chamber. Such arrangements have lacked effective and efficient control of the fuel injection means because of the lack of proper cooperative relation between compressor discharge pressures and burner pressure occurring at different engine speeds. There appear to be no instances in the prior art of the use of diaphragm-actuated control means responsive to compressor discharge pressures and burner pressure for regulating delivery of fuel to the burner of a turbine engine.

DISCLOSURE OF THE INVENTION

The present invention embraces the provision of a fuel delivery and control system and apparatus for feeding liquid fuel to a gas turbine engine wherein compressor discharge pressures and burner pressure are utilized in conjunction with diaphragm means for controlling the operation of a gas turbine engine. In this invention multiple diaphragm means are utilized for the purpose of controlling idling operation of a turbine engine and for controlling the flow of fuel to the engine under normal running conditions and particularly for promoting engine acceleration efficiency.

The invention embraces a fuel flow control system and apparatus for use with a gas turbine engine, the system and apparatus embodying a fuel flow regulating means in association with diaphragm means responsive to differences between the burner pressure and the compressor discharge pressure of the turbine engine to control positioning of the fuel regulating means to vary the speed of the turbine engine. The system and arrangement involves the relative positioning by the operator of the control member for varying the compressor discharge pressure effective on the diaphragm means controlling a fuel regulating valve for regulating the speed of the turbine engine under load conditions.

The invention has for an object the provision of a fuel regulating system and apparatus for a gas turbine engine wherein a pressure responsive diaphragm arrangement associated with a fuel regulating valve is activated by the differential between burner and compressor discharge pressures, the arrangement including a control member manipulated by the operator for venting the compressor discharge pressure effective on the diaphragm arrangement to thereby regulate the speed of the turbine engine through movement of the fuel regulating valve by the diaphragm means.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings.

BRIEF DESCRIPTION OF THE DRAWINGS

The details of my invention will be described in connection with the accompanying drawings in which:

FIG. 1 is a side elevational view of a fuel feed control arrangement of a form of the invention with certain portions shown in section, the sectional portions being taken substantially on the line 1—1 of FIG. 4;

FIG. 2 is a sectional view taken substantially on the line 2—2 of FIG. 4;

FIG. 4 is a front end view of the construction shown in FIG. 1;

FIG. 5 is a rear view of the construction shown in FIG. 1;

FIG. 6 is a fragmentary sectional view taken substantially on the line 6—6 of FIG. 4;

FIG. 7 is a fragmentary elevational view, partly in section, the section being taken substantially on the line 7—7 of FIG. 5.

BEST MODE FOR CARRYING OUT THE INVENTION

Figure 8:
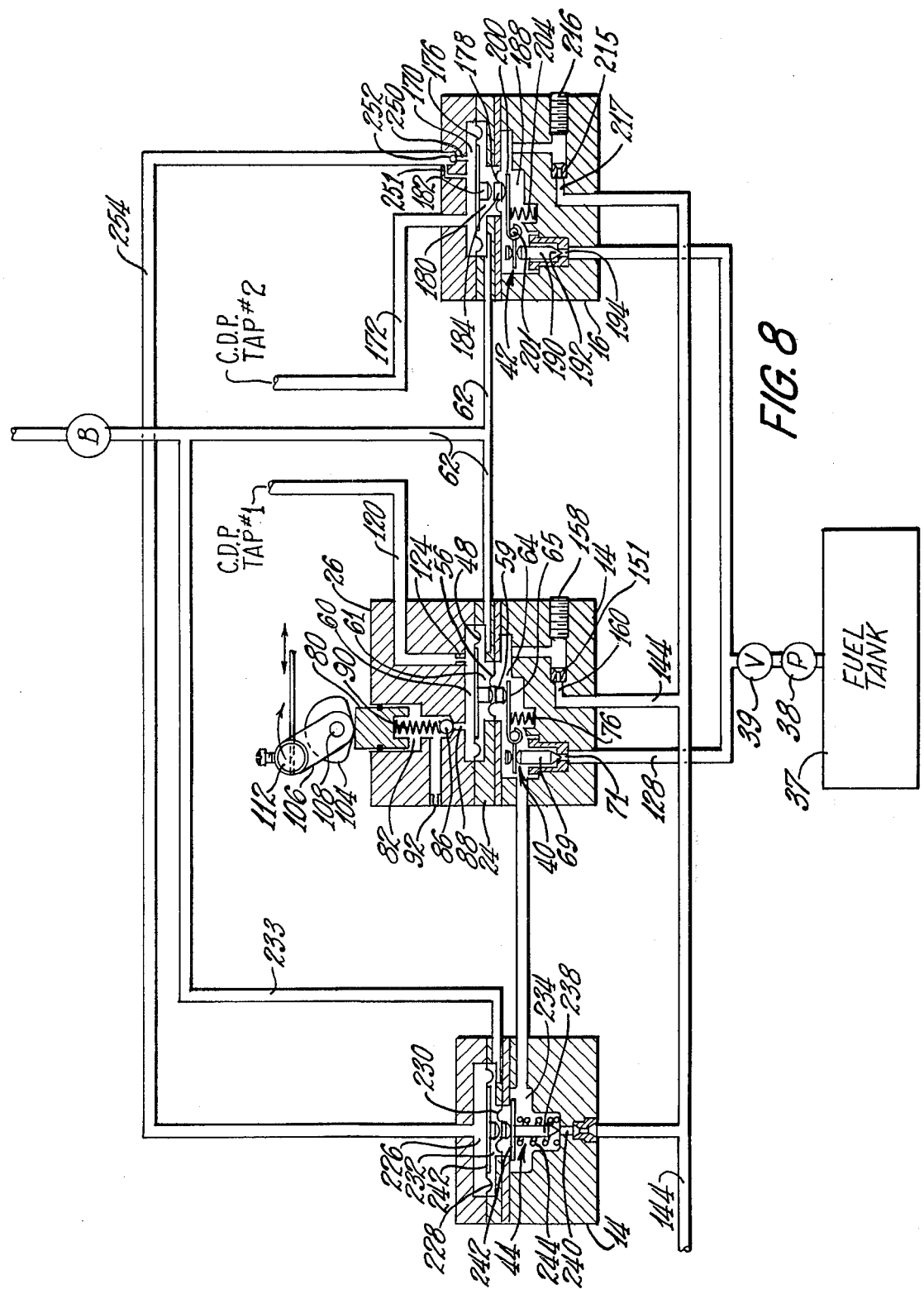
FIG. 8 is a schematic view of the fuel feed and control arrangement illustrating correlation of the components and their operation.

Referring to the drawings in detail, FIGS. 1 through 7 illustrate a form of fuel control system and apparatus for controlling flow of liquid fuel to a gas turbine engine and FIG. 8 is a schematic illustration of the components of the construction for a better understanding of the fuel control arrangement or apparatus and its functioning in connection with a gas turbine engine. The form of apparatus illustrated in the drawings is of a character for use with gas turbines of a horsepower rating of about 15 horsepower or more.

The fuel control system or apparatus is inclusive of diaphragm-actuated fuel control means wherein the diaphragm arrangements are actuated by compressor discharge pressure and burner reference pressure. While FIGS. 1, 2, 5 and 6 do not illustrate several of the fuel channels and pressure transferring channels, FIG. 8 illustrates a simplification of the various channels embodied in the arrangement shown in FIGS. 1 through 7.

The fuel control system and apparatus 10 is inclusive of a body construction 12 comprising two main body components 14 and 16, the main body component 14 being referred to herein as a second body or body member. The body construction 12 includes three laminates, laminar members or components identified by numerals 18, 20 and 22 which, as shown in FIGS. 1 and 2, are in stacked relation with the main body components and are disposed between the main body components.

Disposed adjacent the body component 14 is an additional laminate, laminar member or component 24, and a cover or cover member 26 is disposed adjacent the component or laminate 24. The body construction of the fuel control system and apparatus is secured to a support means, member or mounting plate 28. The mounting plate or support means 28 may be secured to the frame or housing (not shown) of the turbine engine (not shown).

Figure 3:
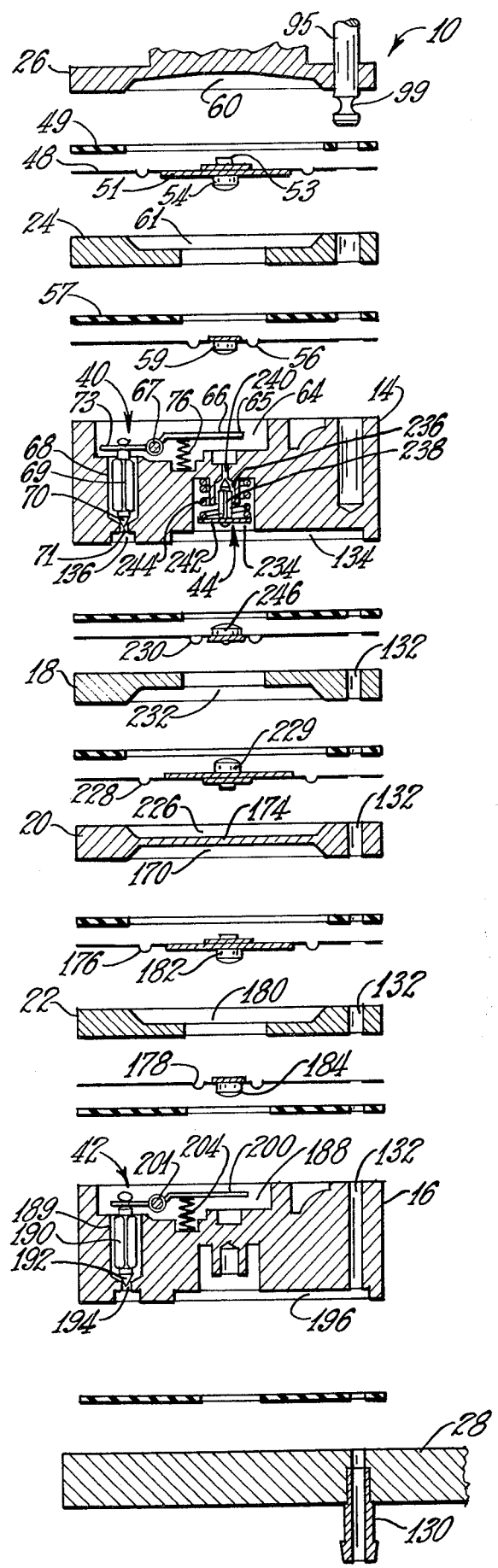
FIG. 3 is an expanded view of the components of FIG. 2.

As particularly shown in FIGS. 1, 2 and 3 the main body sections 14 and 16, the laminates or components 18, 20, 22 and 24 and the cover plate 26 are arranged in stacked or nested relation. These components are provided with a plurality of openings to accommodate threaded bolts 30 which extend through the aligned openings in the components of the body construction and are threaded into threaded openings 32 in the mounting plate 28, one of which is shown in broken lines in FIG. 1.

The heads 33 of the bolts 30 engage the upper surface of the cover member 26 so that all of the components of the body construction are securely retained in the respective nested or stacked positions shown in FIGS. 1, 2, 3 and 6.

Liquid hydrocarbon fuel for a gas turbine engine is supplied from a fuel tank or reservoir illustrated schematically at 37 in FIG. 8 by a fuel pump 38 of a conventional type in association with a fuel cut off valve 39, the pump providing constant fuel pressure when the engine is in operation. A control factor of the fuel supply and control means is a burner reference pressure of the turbine engine. The fuel pump 38 must produce fuel pressure which exceeds the burner reference pressure as otherwise fuel would not be delivered to the turbine engine.

The fuel control system of the invention is inclusive of a diaphragm-controlled valve mechanism indicated at 40 and a second diaphragm-controlled valve mechanism 42. The first fuel control valve construction 40 is for controlling or regulating fuel flow to the turbine engine for normal engine operation, and the second fuel control valve construction 42 is for regulating fuel flow to the turbine engine for engine idling operation. A third diaphragm-controlled valve mechanism 44 is utilized for supplying fuel to the turbine engine for engine starting purposes.

The diaphragm-actuated fuel control valve arrangements are responsive to compressor discharge pressure and burner reference pressure. The control arrangement of the invention requires two different passageways or channel means having their entrance regions under the influence of compressor discharge pressure.

One of the passageways or channels is subject to being vented by a manually actuated means for regulating the influence of the compressor discharge pressure on one of the fuel control diaphragm arrangements while the compressor discharge pressure in the second passageway or channel influences the operation of the other two fuel control valve constructions.

With reference to FIG. 8, the first fuel control valve construction 40 is influenced or controlled by the difference between burner pressure and first compressor discharge pressure referred to as C.D.P. TAP #1 the compressor discharge pressure being transmitted through a passageway or channel 120. The second fuel control valve construction 42 is controlled by the difference between burner pressure and compressor discharge pressure transmitted to the fuel control valve construction 42 by a passageway or channel means 172, this compressor discharge pressure being referred to as C.D.P. TAP #2.

The second fuel control valve construction 42 is for supplying fuel to the engine for engine idling purposes. The third fuel control valve construction 44 is for supplying fuel to the burner of the engine for starting the engine and is under the influence of the compressor discharge pressure C.D.P. TAP #2 through the passageways or channels 172 and 254 shown schematically in FIG. 8.

The fuel control valve constructions are influenced by the burner pressure herein referred to as the burner reference pressure indicated at "B" in FIG. 8. The burner pressure is transmitted by passageways or channels schematically shown at 62 and 233, this arrangement being hereinafter further described.

The first fuel control valve construction 40 is contained within the body component 14, this fuel control means being utilized for controlling the engine speed under load conditions. With particular reference to FIGS. 1, 3 and 8 there is disposed between the cover member 26 and the laminate or component 24 a flexible diaphragm 48 with a sealing gasket 49 adjacent the diaphragm 48. Sealing gaskets similar to gasket 49 of conventional type are disposed between adjacent surfaces of body components, diaphragms and laminates of the body construction hereinafter described.

The diaphragm 48 has a reinforcing disc 51 secured to the diaphragm by a rivet 53. Disposed between the component or laminate 24 and the body component 14 is a diaphragm 56. The space between the diaphragms 48 and 56 defines a chamber 61 which is connected to the burner reference pressure.

The burner reference pressure indicated at "B" in FIG. 8 is transmitted to the chamber 61 beneath the diaphragm 48 by tubular means 62, the tubular means 62 being connected with a fitting 63, shown in FIGS. 1 and 5, supported by the frame or mounting plate 28. The burner reference pressure is transmitted from the fitting 63 through passageways (not shown) in the body construction 12 establishing communication between the fitting 63 and the chamber 61.

Secured to the center of the diaphragm 57 is a rivet 59. Under certain pressure conditions the head 54 of the rivet 53 engages the rivet 59 secured to the diahragm 56. The cover member 26 is fashioned with a recess or chamber 60, one wall of the chamber being provided by the diaphragm 48. The upper region of the body member 14 is provided with a recess 64 in which is disposed a lever or lever member 65 fulcrumed upon a pin 67.

The body component 14 is provided with a bore 68 in which is disposed a relatively movable fuel control valve 69, the needle portion 70 of the valve extending into a fuel inlet port 71, shown in FIGS. 2, and 8. The long arm 66 of the lever member 65, is adapted to be engaged by the head of the rivet 59 carried by the diaphragm 56. The short arm 73 of the lever 65 is articulately engaged with the fuel control needle valve 69. Disposed beneath the long arm 66 of the lever 65 is an expansive coil spring 76 which biases the needle valve 69 toward port-closing position. The needle valve 69 in closed position interrupts fuel flow from the fuel pump 38 into the fuel chamber or recess 64.

The speed of the turbine engine is varied by a manually-operated throttle control member, the relative position of which controls the mechanical pressure on a vent valve for venting the compressor discharge pressure C.D.P TAP #1 in the chamber 60, which variation in pressure in the chamber 60 is communicated by a diaphragm construction to the needle valve 69, the position of which varies the main fuel flow to the burner of the engine.

The rate of fuel delivery past the needle valve 69 is primarily controlled by the compressor discharge pressure effective in the chamber 60. The throttle mechanism, controlled by the operator, for regulating the speed of the turbine engine controls the effective compressor discharge pressure in the chamber 60.

As particularly shown in FIGS. 1 and 8, the throttle control includes a member or plunger 80 which is slidably reciprocable in a bore 82 provided in the cover member 26. An inner end region of the bore is provided with a counter-bore 84 of reduced diameter accommodating a ball valve or valve means 86 which is adapted to normally close a port 88, the port 88 being in communication with the chamber 60 as shown in FIGS. 1 and 8.

Disposed between the valve member or ball 86 and the bottom of a bore in the plunger 80 is an expansive coil spring 90, the pressure of the spring normally holding the ball valve 86 on its seat closing the port 88. The bore 82 is provided with a very small vent opening 92. When the compressor discharge pressure in the chamber 60 and the port 88 becomes greater than the pressure of the spring 90, the ball valve 86 is moved away from its seat to relieve, reduce or vent pressure in chamber 60 from the first compressor discharge pressure C.D.P. TAP #1.

The body member 14, laminate 24 and cover member 26 are provided with aligned openings in which is rotatably mounted a shaft 95, shown in FIGS. 1 and 2. The shaft 95 is maintained in the openings by means of a tenon portion 97 on a threaded member or screw 98, the tenon portion engaging in a recess 99 formed in the shaft 95 as shown in FIG. 1.

The end portion of the shaft 95 extending above the cover member 26 is fashioned with a squared end 102 to receive a squared opening in a cam member or cam plate 104 and a squared opening in a throttle operating arm or member 106, the cam plate 104 and operating arm 106 being secured on the shaft by means of a screw 108.

The distal end of the operating arm or member 106 has an opening accommodating a tenon portion 110 of a swivel member 112, the end of the tenon portion being swaged to retain the swivel member 112 on the operating arm 106. The pivotally mounted or swivel member 112 is provided with an opening 114 to receive a conventional manipulated wire or cable (not shown) which is retained in the swivel member 112 by a screw 116.

By manipulating the wire or cable member the operating arm 106 and cam plate 104 may be rotated whereby the same contour on the cam plate 104 effects reciprocatory movement of the plunger 80 and the pressure exerted by the spring 90 on the ball valve 86 may be varied. By moving the operating arm 106 in a direction whereby the cam contour of the plate 104 moves the plunger 80 inwardly to the bore 82, the spring pressure acting on the ball valve 86 is increased preventing venting of compressor discharge pressure C.D.P. TAP #1 in chamber 60.

This action results in increasing the compressor discharge pressure C.D.P. TAP #1 on the diaphragm 48 causing the diaphragm to swing the lever 65 in a clockwise direction as viewed in FIGS. 2 and 8 to further open the fuel regulating needle valve 69 increasing fuel flow to the turbine engine and hence increasing the speed of the engine.

Increasing engine speed increases the compressor discharge pressure and the burner pressure "B". When the increased compressor discharge pressure builds up in the chamber 60 sufficient to move the ball valve 86 away from its seat, the chamber 60 is slowly vented through the small vent opening 92. Through this arrangement the engine speed is stabilized for a particular relative position of the throttle control cam 104 and operating arm 106. Thus the engine speed may be varied by the operator manipulating the cam plate 104 to a position to attain a desired speed of the turbine engine.

The compressor discharge pressure C.D.P. TAP #1 is transmitted from the compressor through a channel or tube 120, shown in FIG. 8, and the channel or tube connected with a fitting 122 mounted upon the frame, mounting plate or support 28 shown in FIGS. 1 and 5. The tube 120 extends into the compressor chamber of the turbine engine in a position to be responsive to the compressor discharge pressure C.D.P TAP #1. This compressor discharge pressure is also referred to herein as the first compressor discharge pressure.

The fitting 122, shown in FIGS. 1 and 5, which is connected with the tube 120 is provided with a restriction 124, shown schematically in FIG. 8, which provides a very small opening to accommodate passage of air under pressure from the compressor discharge pressure C.D.P. TAP #1 to the chamber 60. The restriction 124 is for the purpose of reducing the rate of change of pressure in the chamber 60 so that during engine operation, the pressure in the chamber 60 varies at a slow rate so as to prevent abrupt opening of the ball valve 86.

The fuel under pressure from the fuel pump 38 flows through a conduit or tube 128, shown in FIG. 8, and through a fitting 130, shown in FIGS. 1 and 5, into a fuel channel 132, shown in FIGS. 2 and 3, and through a channel 134 into a region 136 to the port 71 adjacent the needle valve 69. The channel 132 is constituted by a plurality of aligned openings in the body portion 16, and laminates or laminations 18, 20 and 22 shown in FIGS. 2 and 3.

Metered liquid fuel from the chamber or recess 64 is conveyed to the fuel burner of the turbine engine by interconnected channels or passageways in the body construction 12 and tubular means 144, the latter being shown in FIG. 8, the fuel conveying means including means for metering the flow rate of fuel from the chamber 64.

The passageways or fuel channels in the body construction 12 are connected with a fuel outlet fitting 140, shown in FIGS. 1, 5 and 6, carried by the mounting plate or frame plate 28, the fitting 140 being connected with the tubular means 144.

The arrangement includes means for metering the amout or rate of fuel flowing from the chamber 64 to the burner of the turbine engine. Referring particularly to FIG. 6, the body component 14 is provided with a bore 148 which is in communication with the chamber 64 by a passage (not shown). In communication with the bore 148 is a passageway or port 160 of reduced cross section which is in communication with a passageway or channel 152. Positioned in bore 148 ahead of port 160 is an insertable metering jet valve 151 for fuel metering.

The passageway 152 is in communication with a passageway 154, the latter being formed by aligned openings provided in the laminates 18, 20, 22, and body component 16. The passageway 154 is in direct communication with the fitting 140 to which is connected the tubular means 144 for conveying fuel to the burner of the turbine engine.

An insertable type jet means 151 is provided associated with the bore 148 and port 160 for metering or regulating the fuel flowing through passageways 152 and 154 to the turbine engine. The bore 148 can accommodate a threaded portion for an adjustable valve means or member. A plug 158 is provided to close the bore 148 at the end opposite port 160. A sealing ring 162 encircles the plug 158 and is held in fluid sealing engagement within the bore 148 in a conventional manner. It is to be understood that the fixed restriction 151 for fuel metering could be replaced with an adjustable valve to provide a means to vary the fuel metering through port 160. Such adjustable valve members include a needle valve arrangement.

From the foregoing it will be apparent that the control of the speed of the turbine engine is regulated by manipulating the arm 106 to adjust the position of the cam member 104 and thereby control the pressure of the spring 90 on the ball valve 86 and the venting of pressure in the chamber 60.

By reason of the regulation of fuel flow past the needle valve 69 under the influence of pressure in the chamber 60, the engine will be accelerated by increased flow of fuel past the needle valve 69 until the compressor discharge pressure in the chamber 60 is sufficiently increased to move the ball valve 86 from its seat and vent the chamber 60 through the vent 92 and stabilize the speed of the engine.

To reduce the engine speed, the operator moves the arm 106 and the cam plate 104 until the cam surface of plate 104 permits movement of the plunger 80 toward its outermost position in which position reduced pressure of the spring 90 is exerted on the ball valve 86 so that the ball valve is opened by the compressor discharge pressure C.D.P. TAP #1 and the pressure in the chamber 60 is thus reduced.

Under the effect of reduced pressure in chamber 60, the diaphragm 48 is flexed upwardly relieving pressure on the lever 65 whereby the needle valve 69 under the pressure of the coil spring 76 closes the port 71 interrupting fuel flow to the engine through the port 160 and passageways 152 and 154 to the burner of the engine.

The relative size of restriction 124 determines the rate of volume change to chamber 60 as the discharge pressure is being monitored at tap #1. Vent 92 is very small thereby allowing for slow venting, and serves to relieve the pressure from chamber 60 to the atmosphere when ball valve 86 is moved against spring 90. Therefore, the relative size of restriction 124 influences the rate of change of pressure on diaphragm 48, which regulates the rate of fuel delivery to the engine under load conditions. Similarly vent 92 helps to regulate fuel delivery in nominal fashion as it vents the pressure of chamber 60 to the atmosphere after ball valve 86 has opened against spring 90. The restriction 124 and vent 92 thereby allow smooth changes in the pressure changes and thus smooth changes in turbine speed.

A second diaphragm-controlled valve arrangement 42 is provided for supplying fuel to the turbine engine for engine idling purposes. The control for regulating fuel for engine idling purposes is responsive to the difference between the burner pressure and the second compressor discharge pressure C.D.P. TAP #2. The diaphragm arrangement and needle valve control mechanism 42 is contained in the second body component 16 and is illustrated in FIGS. 2 and 3 and is schematically illustrated in FIG. 8. The second compressor discharge pressure is communicated from the compressor of the engine to a chamber 170 by a tubular means 172 and a fitting 173, shown in FIGS. 1 and 5, carried by the mounting plate or frame plate 28.

The body construction 12 is provided with intercommunicating passageways (not shown) establishing communication between the chamber 170 and the fitting 173 whereby the second compressor discharge pressure C.D.P. TAP #2 is communicated to the chamber 170. The chamber 170 is defined by a central web portion 174 of the laminate 20 and a flexible diaphragm 176 being disposed between the laminates 20 and 22.

Disposed between the laminate 22 and the body component 16 is a flexible diaphragm 178. The diaphragms 176 and 178 define a chamber 180. As shown in FIG. 8, the chamber 180 is connected with the burner pressure "B" by passage means (not shown) being passageways in the body construction 12 in a communication with the burner pressure fitting 63 and tubular means 62. The diaphragm 176 is equipped at its central region with a member or button 182, and the diaphragm 178 equipped with a similar button 184.

The needle valve mechanism 42 is disposed in a recess or chamber 188 provided in the body component 16. The body component 16 is provided with a bore 189 in which is disposed a fuel control valve 190, the needle portion 192 of the valve extending into a fuel inlet port 194. The fuel port 194 is in communication with the fuel pasage 132 and the fuel inlet fitting 130 by passageway or channel 196.

The second compressor discharge pressure C.D.P. TAP #2 in the chamber 170 and the burner pressure in the chamber 180 cause movement of the diaphragms 176 and 178 to regulate the relative position of the fuel control valve 190 through the medium of the lever 200 when the burner pressure and the second compressor discharge pressure exert downward movement of the diaphragms 176 and 178. The button 184 swings the lever 200 in a clockwise direction about its fulcrum which moves the fuel control valve 190 away from the port 194 to admit fuel into the chamber or recess 188.

The fuel from the chamber 188 is conveyed to the turbine engine for establishing idling operation of the engine. The arrangement includes means for metering or regulating the rate of engine-idling fuel flow from the chamber 188 to the engine. Referring particularly to FIG. 6, the body component 16 is provided with a bore 208 which is in communication with the fuel chamber 188 through passageways or passage means (not shown) in the body construction.

In communication with the inner end of the bore 208 is a passageway or port 217 of reduced cross section which is in communication with a passageway or channel 212. As shown in FIG. 6, the passageway 212 is in communication with the passageway 154 and the fitting 140 whereby fuel flowing through the port 217 is conveyed to the burner of the turbine engine for engine idling purposes. An insertable metering jet valve 215 is positioned in bore 208 to function as a fixed restriction to meter or regulate the fuel flow through bore 208 to port 217.

Bore 208 is provided with a threaded portion to accommodate a threaded plug 216 to close the end of the bore 208 opposite port 217. A sealing ring 219 encircles and engages the plug 216 to fluidly seal bore 208. Jet 215 regulates the fuel flow past the idle fuel system to thereby regulate the engine idling speed. A variable valve member, such as an adjustable needle valve may also be provided to regulate the idle fuel flow. The fuel control arrangement 42 is to maintain the turbine engine at idling speed when the throttle control plunger 80 is at its outermost position as shown in FIG. 8 in which position the needle valve 69 interrupts fuel flow causing the turbine engine to decelerate.

Under the influence of the second compressor discharge pressure C.D.P. TAP #2, communicated to the chamber 170, the pressure in chamber 170 through the diaphragm 176 and lever 200 maintains the needle valve 190 in an open position whereby fuel is conveyed through tubular means 144 to the engine to maintain the engine at idling speed. The flow rate of the fuel flowing past the needle valve 190 is restricted as desired for proper engine idling speed by jet 215 shown in FIG. 6.

During normal engine operation under load conditions, fuel from the fuel chamber 64 flowing past the fuel metering jet 151 and fuel from the fuel chamber 188 flowing past the jet 215 is conveyed by the tubular means 144 to the burner of the turbine engine.

The compressor discharge pressures C.D.P. TAP #1 and C.D.P. TAP #2 are always substantially equal. However, the pressures in chambers 60 and 170 are only equal when ball 86 is in the closed position. When the throttle member 106 and the cam 104 are moved in a counterclockwise direction, as viewed in FIG. 8, wherein the throttle is in idle position to reduce the speed of the engine, the ball valve 86 is opened under the influence of the compressor discharge pressure C.D.P. TAP #1 and the pressure in the diaphragm chamber 60 is relieved and vented through the vent opening 92.

The reduction of the compressor discharge pressure C.D.P. TAP #1 occurs at a reduced rate under the influence of the restriction 124 in the tubular means 120 which conveys the compressor discharge pressure C.D. TAP #1 from the engine compressor. This action prevents an abrupt closing of the valve 69 through retarded movement of the diaphragm 48.

The opening of the ball valve 86 reduces the compressor discharge pressure in the chamber 60 on the diaphragm 48 and the needle valve 69 gradually moves to a closed position interrupting main fuel flow past the metering jet 151 shown in FIG. 6.

The compressor discharge pressure C.D.P. TAP #2 is not vented so that compressor discharge pressure is maintained in the chamber 170 which causes the diaphragm-actuated needle valve 190 to remain open so that fuel for engine idling purposes continues to flow from the chamber 188 through the tubular means 144 to the burner of the turbine engine.

By reason of the continued fuel flow past the needle valve 190 into the chamber 188 thence past the metering jet 215, fuel at a restricted or metered rate continues to flow through the tubular means 144 to the burner of the turbine engine for engine idling purposes so that "flame-out" of the engine burner is prevented.

The continued fuel flow from the chamber 188 past the metering jet 215 prevents any abrupt change in fuel flow to the engine burner. The valve control arrangement 42 is to reduce the tendency for burner "flame-out" as well as to supply metered fuel for engine idling.

As shown in FIGS. 2 and 3, a chamber 226 is provided between the web 174 of the laminate 20 and a diaphragm 228 disposed between the laminates 18 and 20. A diaphragm 230 is disposed between the laminates 18 and the body component 14. The region between the diaphragms 228 and 230 provides a chamber 232. The chamber 232 is connected by passageways, shown schematically at 233 in FIG. 8, in the body construction 12 in communication with the fitting 63 for connection with the burner pressure "B".

Formed in the body component or member 14 is a chamber 234, the diaphragm 230 forming one wall of the chamber 234. Slidably disposed in a bore 236 in the body component 14 is a normally open needle valve 238 which controls fuel flow through a port 240. As shown in FIGS. 2 and 3, the lower end of the needle valve 238 is secured to a disc 242. Disposed between the disc 242 and an end wall of the chamber 234 is an expansive coil spring 244, the coil spring 244 biasing the needle valve 238 to an open position so that when the engine is not in operation the port 240 is open.

The diaphragm 228 is provided with a button or member 229 and the diaphragm 230 is provided with a button or member 246. Normally open valve 238 provides added fuel for starting and closes when the engine is started and attains idle speed. In starting the engine, compressor discharge pressure is built up in the chamber 226 causing the buttons 229 and 246 to be engaged and button 246 engages with the needle valve 238 to close the port 240.

Means is provided for maintaining the valve 238 in port-closing position after the engine has been started. As shown in FIGS. 7 and 8, a port 250 opens into the diaphragm chamber 170 and a check valve or ball valve 252 cooperates with the port 250. As shown schematically in FIG. 8 the port 250 is connected by channel means 254 with the diaphragm chamber 226. The actual port and valve construction is illustrated in FIG. 7 and the channel 254 is a schematic illustration of the passageway connection between the chambers 170 and 226 shown in FIG. 8.

When the turbine engine is in operation, the compressor discharge pressure C.D.P. TAP #2 which enters the chamber 170 from the tubular channel 172 shown in FIG. 8 and fitting 173 shown in FIGS. 1 and 5 is communicated by the passageway 254, shown in FIG. 8, to the chamber 226 so that the compressor discharge pressure is retained in the chamber 226 when the ball valve 252 closes the port 250 so as to maintain the needle valve 238 in port-closing position during operation of the turbine engine.

A very small bleed hole or bypass vent 251 is shown in FIG. 8 communicating between passageway 254 and chamber 170. The ball valve 252 and vent 251 allow the pressure in the chamber 226 to increase at the same rate as CDP tap #2 which influences the diaphragm 228 to close the needle valve 238 and maintain the valve closed during engine operation. Hence the needle valve 238 is only open when the engine is not in operation to admit fuel from the chamber 64 to the turbine engine for starting the engine. This bleed hole provides a means to vent chamber 226 at engine shutdown and allows the pressure in chamber 226 to decrease slowly. During shutdown valve 238 remains closed until the turbine RPM's and pump (P) pressure reach zero. Venting the chamber 226 at shutdown allows valve 238 to operate in its normal mode. The vent hole 251 does not hinder the closing of valve 238 as it has been found that the pressure in chamber 226 increases rapidly during start up but decreases slowly at decreasing speeds or at shutdown.

Initial rotation of the engine by the starting motor also actuates the fuel pump, and the initial differential in pressure between burner and compressor discharge pressure exerts sufficient pressure on the diaphragm 48 to open the needle valve 69 and admit fuel to the chamber 64 and to the chamber 234.

The operation and action of the fuel control system and apparatus of the invention in controlling a gas turbine engine is as follows: It is conventional practice in starting gas turbine engines to electrically heat a glow element in the burner chamber of the turbine engine in order to ignite the fuel delivered into the air stream from the rotary air compressor of the engine. Initial rotation of the rotary components of the turbine engine is initiated by an electrically energizable motor or other suitable means.

In starting a gas turbine engine supplied with fuel from the fuel control system and arrangement of the invention, the fuel pump valve 39 is opened. The glow element is preheated to the proper temperature for igniting the fuel. When the glow tube has reached the proper temperature the electrically energizable motor for rotating the rotatable components of the turbine is energized.

The energizable motor also operates the fuel pump 38 to deliver fuel under pressure through the tubular or channel means 128, shown schematically in FIG. 8, to the regions of the diaphragm-actuated valve arrangements 40 and 42. The valve arrangements 40 and 42 provide fuel flow for normal operation of the turbine engine. The valve arrangement 42 is for supplying fuel for engine idling purposes.

During initial rotation of the rotary compressor of the turbine engine, compressor discharge pressure is established in the pressure transfer tubes 120 and 172 shown in FIG. 8. The pressure is communicated to the chambers 60 and 170 causing the needle valves 69 and 190 to be opened. The compressor discharge pressure is transferred from the chamber 170 through the small port 250 past the ball valve 252 to the chamber 226.

During the period of initial rotation of the compressor of the turbine engine, the pressure in chamber 60 opens the fuel valve 69 and fuel under pressure is transmitted by passage means, shown schematically in FIG. 8, from the fuel chamber 64 to the fuel chamber 234. During the initial rotation the pressure differential between C.D.P. #2 and the lower pressure acting on diaphragm 228 is not adequate to overcome the bias force of spring 244, and valve 238 will remain open until that bias force is overcome. Small port 250 communicating between chamber 170 and channel 254 serves to dampen the pressure changes between C.D.P. #2 and chamber 170. Fuel from the chamber 234 flows past the open needle valve 238 through the port 240 and passageway 144 to the fuel delivery passage in the burner of the turbine engine. Thus, the starting fuel for the engine flows past the open needle valve 238.

Upon initial running operation of the engine, the operator-controlled throttle plunger 80 is moved, inwardly, as viewed in FIGS. 1 and 8, increasing the spring pressure on the ball valve 86 and increased compressor discharge pressure communicated into the chamber 60. The burner reference pressure "B" is communicated to the chamber 61.

An increased differential between the increasing compressor discharge pressure in the chamber 60 and the increasing burner reference pressure in the chamber 61 causes the diaphragm button 59 to move further downward. The pressure in chamber 60 increases faster than the pressure in chamber 61. This further opens the main fuel control needle valve 69 to supply the engine with fuel for acceleration and normal operation.

The fuel for normal engine operation is metered by the metering jet 151, shown in FIGS. 6 and 8, to which is added the fuel for engine idling which is metered by jet 215.

If the operator desires to increase the speed of the turbine engine and maximum fuel flow past the metering needle jet 151 is not occurring, the operator moves the arm 106 in a clockwise direction, as viewed in FIG. 8, which movement cxauses the cam surface 104 to further depress the plunger 80 inwardly thereby increasing the pressure of the coil spring 90 on the relief valve 86 and the resultant increased compressor discharge pressure in the chamber 60 effects further opening of the fuel valve 69, thereby increasing the speed of the engine.

The speed of the engine will thus be stabilized dependent upon the particular relative position of the plunger 80 which determines the pressure of the expansive spring 90 and the ball valve 86. When the compressor discharge pressure from C.D.P. TAP #1 communicated to the chamber 60 is constant the burner pressure varies with the engine RPM. The compressor discharge pressure is being vented past relief valve 86 and vent 92. The diaphragm 48 is moving with changes in the lower pressure in chamber 61 and thus controlling fuel inlet valve 69 to maintain the engine speed.

In the event that the engine tends to increase in speed, the compressor discharge pressure in chamber 60 increases, overcoming the pressure of the coil spring 90 whereby the ball relief valve 86 is opened and chamber 60 vented through the opening 92 to thereby reduce the compressor discharge pressure in chamber 60.

This reduction in pressure in the chamber 60 causes the diaphragm 48 to be moved upwardly. Such diaphragm movement enables the fuel control valve 69 to move toward closed position thus reducing fuel flow to the burner of the engine with a consequent reduction in engine speed.

When the engine speed is slightly decreased, the compressor discharge pressure in chamber 60 is decreased so that the spring 90 again moves the ball vent valve 86 to closed position. This action thus stabilizes the speed of the engine for a particular position of the throttle arm 106 and the cam 104.

To thereafter increase engine speed, the manually-controlled plunger 80 must be moved further inwardly as viewed in FIGS. 1 and 8 to thereby prevent the pressure relief valve 86 from being moved to an open position under the increased compressor discharge pressure resulting from increased engine speed.

When it is desired to reduce the engine speed to engine idling operation, the operator moves the throttle arm and cam surface 104 to the position, as viewed in FIG. 8, to permit the plunger 80 to be moved to its outermost position under the influence of the expansive coil spring 90.

This action reduces the pressure of spring 90 on the ball relief valve 86 which is opened venting the compressor discharge pressure in chamber 60. The reduced compressor discharge pressure in the chamber 60 causes the diaphragms 48 and 56 to move upwardly and the fuel valve 69 to be closed under the pressure of the coil spring 76. Closing the fuel valve 69 reduces the speed of the engine to idling speed.

The maximum engine speed as determined by the position of cam 104 is attained when the maximum fuel flow is determined by the factory adjusted and fixed position of the metering jet valve 151 shown in FIG. 6. Even if the plunger 80 is moved further inwardly by movement of the cam surface 104 by the throttle arm 106, the engine speed will not be increased above that speed which results from the maximum fuel flow past the metering jet valve 151. The jet valves 151 and 215 are fixed in position at the factory for overtemperature protection.

The valve mechanism 42 is operative to supply fuel to the turbine engine for engine idling operation. The compressor discharge pressure C.D.P. TAP #2 is transmitted to the chamber 170 through the passageway 172, and the burner pressure of the engine transmitted through the passageway 62 to the chamber 180.

These pressures in the chambers 170 and 180 are effective to maintain the needle valve 190 in open position to admit fuel from the fuel pump into the chamber 188 thence past the jet valve 215, shown in FIGS. 6 8, to supply fuel through the passageway 144 to the burner of the turbine engine.

The metering jet valve member 215 is adjusted to supply just sufficient fuel from the chamber 188 to the burner to maintain the turbine engine rotating at a desired idling speed.

Rotation of the turbine engine may be stopped by closing the fuel cutoff valve 39 which interrupts all fuel flow to the burner of the turbine engine.

It is apparent that, within the scope of the invention, modifications and different arrangements may be made other than as herein disclosed, and the present disclosure is lllustrative merely, the invention comprehending all variations thereof.

I claim:

1. Apparatus for controlling flow of liquid fuel to a turbine engine comprising a body construction, a diaphragm-actuated fuel control valve means in said body construction responsive to the difference between the engine compressor discharge pressure and the burner reference pressure for controlling fuel flow to the engine, and relatively movable means for varying the effective compressor discharge pressure on the diaphragm-actuated valve means for regulating fuel flow to the engine to control the speed of the engine.

2. Apparatus for controlling flow of liquid fuel to a turbine engine comprising a body construction, a first diaphragm-actuated fuel control valve means in said body construction for controlling fuel flow for normal engine operation, and a second diaphragm-actuated fuel control valve means in said body construction for controlling flow of fuel to the turbine engine for idling operation of the engine, said first and second disphragm-actuated valve means being responsive to the difference between engine compressor discharge pressure and the burner reference pressure for controlling fuel flow.

3. Apparatus according to claim 2 including a fuel metering restriction in a fuel passage from the first fuel control valve to the engine for limiting fuel flow for normal engine operation.

4. Apparatus according to claim 2 including a fuel metering restriction in a fuel passage from the second fuel control valve to the engine for limiting fuel flow for engine idling operation.

5. Apparatus for controlling flow of liquid fuel to a turbine engine comprising a body construction, a diaphragm-actuated fuel control valve in said body construction for controlling fuel flow for normal engine operation, and an additional diaphragm-actuated fuel control valve for controlling flow of fuel to the turbine engine for starting the engine wherein said fuel control valve for normal engine operation is responsive to the difference between engine compressor discharge pressure and burner reference pressure for controlling fuel flow, and the additional fuel control valve for starting the engine is responsive to the difference between engine compressor discharge pressure and burner reference pressure for maintaining said additional fuel control valve in a closed position when said engine has been started.

6. Apparatus for controlling flow of liquid fuel to a turbine engine comprising a body construction, a first diaphragm-actuated fuel control valve in said body construction for controlling fuel flow for normal engine operation, a second diaphragm-actuated fuel control valve for controlling fuel flow to the turbine engine for idling operation of the engine, and a third diaphragm-actuated fuel control valve for controlling flow of a fuel to the engine for starting the engine wherein said first and second diaphragm-actuated valves are responsive to the difference between engine compressor discharge pressure and burner reference pressure for controlling fuel flow, and the third diaphragm-actuated valve being responsive to the difference between engine compressor discharge pressure and burner reference pressure for maintaining said third valve in closed position when the engine has been started.

7. Apparatus for controlling flow of liquid fuel to a turbine engine comprising a body construction, a fuel control valve in said body construction, diaphragm means associated with said fuel control valve responsive to the difference between engine compressor discharge pressure and burner reference pressure for controlling the fuel control valve, a relief valve means resiliently biased toward closed position for regulating the effective compressor discharge pressure on the fuel control diaphragm means, and a manually-controlled movable member for varying the biasing pressure on said relief valve means to thereby regulate the speed of the turbine engine.

8. Apparatus according to claim 7 including an adjustable restriction in a fuel supply passage to the engine for limiting fuel flow to the engine for normal engine operation.

9. Apparatus for controlling flow of liquid fuel to a turbine engine comprising a body construction, a fuel control valve in said body construction, means associated with said fuel control valve responsive to the difference between engine compressor discharge pressure and burner reference pressure for controlling the fuel control valve, a port in communication with the compressor discharge pressure, a relief valve for said port, means biasing the relief valve toward port closing position, and an operator-controlled movable member for varying the biasing pressure on said relief valve, said relief valve being opened when the compressor discharge pressure exceeds the biasing pressure on the relief valve to stabilize fuel flow to the engine, the relative position of the movable member determining the speed of the engine.

10. Apparatus for controlling flow of liquid fuel to a turbine engine comprising a body construction, a fuel control valve in said body construction, means responsive to the difference between engine compressor discharge and burner reference pressure for controlling the fuel valve, a relief valve for varying the effective pressure on the fuel valve controlling means, a manually controlled movable member, resilient means disposed between the movable member and the relief valve, said member being movable to positions varying the pressure of the resilient means on the relief valve to vary the compressor discharge pressure controlling the fuel control valve and thereby regulate fuel flow to the turbine engine for varying the speed of the engine.

11. Apparatus for controlling flow of liquid fuel to a turbine engine comprising a body construction, a first diaphragm-actuated fuel control valve in said body construction for controlling fuel flow for normal engine operation, a second diaphragm-actuated fuel control valve in said body construction for controlling flow of fuel to the turbine engine for idling operation of the engine, and a third fuel control valve being in open position when the engine is not in operation, and passage means transferring engine compressor discharge pressure and burner reference pressure to the third diaphragm-actuated fuel control valve to maintain the third valve in closed position when the engine is in operation.

12. Apparatus for controlling flow of liquid fuel to a turbine engine comprising a body construction, a first diaphragm-actuated fuel control valve in said body construction responsive to the difference between engine compressor discharge pressure and burner reference pressure transmitted from the engine through passage means for controlling fuel flow for normal engine operation, a second diaphragm-actuated fuel control valve in the body construction responsive to the difference between engine compressor discharge pressure and burner reference pressure transmitted through other passage means from the engine for controlling fuel flow to the turbine engine for idling operation of the engine, and a third diaphragm-actuated fuel control valve in the body construction, said third fuel control valve being normally open when the engine is not in operation, said third fuel control valve in open position supplying fuel to the turbine engine during starting operation of the engine, said third diaphragm-actuated fuel control valve being responsive to the difference between engine compressor discharge pressure and burner reference pressure after the turbine engine is started for closing the third fuel control valve and maintaining said third valve in closed position during operation of the turbine engine.

13. Apparatus for controlling flow of liquid fuel to a turbine engine comprising a body construction, a fuel receiving recess in the body construction, a fuel control valve in said body construction for regulating fuel flow from a supply into the recess, a first chamber in the body construction, a first diaphragm forming all of the first chamber, a second diaphragm in the body construction spaced from the first diaphragm, the space between the diaphragms forming a second chamber, means associated with said diaphragms for controlling the fuel control valve, passage means for transferring engine compressor discharge pressure to said first chamber, passage means for transferring burner pressure of the engine to the second chamber, a port in said body construction in communication with the first chamber, a relief valve for said port, resilient means biasing said relief valve toward port closing position, said relief valve adapted to be opened under the influence of compressor discharge pressure when the latter exceeds the pressure of the resilient means to relieve pressure in the first chamber, the reduced pressure in the first chamber influencing the fuel control valve to a position to stabilize the speed of the engine, and a manually controlled movable member for varying the resilient biasing pressure on said relief valve to thereby vary the fuel flow past the fuel control valve for regulating the speed of the turbine engine.

14. Apparatus according to claim 13 including a fuel flow passage in the body construction accommodating flow of fuel from the fuel receiving recess to the engine, and a restriction in said fuel flow passage for limiting fuel flow to the engine.

15. Apparatus according to claim 13 including a restriction in the passage means transferring engine compressor discharge pressure to the first chamber for retarding the rate of reduction of compressor discharge pressure in the first chamber when the relief valve is in open position.

16. Apparatus for controlling flow of liquid fuel to a turbine engine comprising a body construction, a chamber in said body construction, a fuel control valve for a fuel receiving recess in said body construction, diaphragm means associated with said fuel control valve responsive to the difference between the engine compressor discharge pressure and burner reference pressure for controlling the fuel control valve, a port in communication with the chamber, a relief valve for said port, means biasing the relief valve toward port-closing position, said relief valve arranged to be opened when the compressor discharge pressure exceeds the biasing pressure on the relief valve whereby reduced pressure in said chamber causes the fuel control valve to be moved toward closed position to reduce fuel flow into the recess and to the engine, and an operator-controlled movable member for varying the biasing pressure on said relief valve to thereby vary the fuel flow to the engine for controlling the speed of the engine.

17. Apparatus according to claim 16 including a second chamber in the body construction, a second fuel control valve for a second diaphragm means associated with said second chamber and said second fuel control valve responsive to the difference between engine compressor discharge pressure, supplied through a separate passageway from the engine compressor to said second chamber and the burner reference pressure for controlling the second fuel control valve supplying fuel to the engine for engine idling purposes.

18. Apparatus according to claim 17 including a third chamber in the body construction, a third fuel control valve for a third fuel receiving recess in said body construction, a third diaphragm means associated with said third chamber and said third fuel control valve, being in open position when the turbine engine is not in operation, said third fuel control valve in open position adapted to accommodate flow of fuel from the third fuel recess to the turbine engine for starting the engine, passage means between said second chamber and said third chamber for transmitting engine compressor discharge pressure from the second chamber to the third chamber and the third diaphragm being operative by the pressure difference between compressor discharge pressure and the burner reference pressure to close the third fuel control valve when the engine is in operation and retain said third fuel control valve in closed position.

* * * * *